US011092803B2

(12) United States Patent
Chen

(10) Patent No.: US 11,092,803 B2
(45) Date of Patent: Aug. 17, 2021

(54) HEAD-UP DISPLAY DEVICE WITH REFLECTING TARGET DIFFUSER SHEET

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 216 days.

(21) Appl. No.: 16/435,492

(22) Filed: Jun. 8, 2019

(65) Prior Publication Data
US 2020/0386991 A1 Dec. 10, 2020

(51) Int. Cl.
*G02B 5/02* (2006.01)
*G02B 27/01* (2006.01)
*G02B 27/48* (2006.01)

(52) U.S. Cl.
CPC ....... *G02B 27/0101* (2013.01); *G02B 5/0284* (2013.01); *G02B 27/48* (2013.01); *G02B 2027/0118* (2013.01)

(58) Field of Classification Search
CPC .. G02B 5/0284; G02B 27/0101; G02B 27/48; G02B 2027/0118; G02B 27/0172
See application file for complete search history.

(56) References Cited

U.S. PATENT DOCUMENTS 10,379,398 B2 * 8/2019 Narushima ....... G02F 1/133605
2016/0085084 A1 * 3/2016 Masson .................. G02B 27/48
359/633

* cited by examiner

*Primary Examiner* — Ryan D Howard
(74) *Attorney, Agent, or Firm* — Guice Patents PLLC

(57) ABSTRACT

The present invention relates to a head-up display device with reflecting target diffuser sheet, which includes an image projection module and a reflecting target diffuser sheet, an array of micro-mirrors is set on the reflecting target diffuser sheet for reflecting and diffusing the image light source projected by the image projection module to design diffusion areas, the intersection range of the design diffusion areas is an Eye Box, the projected images can be seen when an eye is in the range of the Eye Box, to thereby reduce the bright unevenness caused by interference, and maximize image brightness.

9 Claims, 18 Drawing Sheets

HEAD-UP DISPLAY DEVICE WITH REFLECTING TARGET DIFFUSER SHEET

BACKGROUND OF THE INVENTION a) Field of the Invention

The present invention relates to a head-up display device with reflecting target diffuser sheet and, more particularly, to a head-up display device with reflecting target diffuser sheet provided to reduce interference, to thereby reduce the bright unevenness caused by interference, achieve low cost by not having too much structure, and maximize image brightness.

b) Description of Prior Art

The head-up display technology recently used in vehicles is an optical system, which is generally consisted of two main devices, a projector and a combiner; the projector is consisted of a signal source, a projection mirror and other optical components; the signal source of the projector is consisted of a LCD liquid crystal display or a projector and a display screen, light is emitted from the signal source and projected to the combiner or a special transparent screen set on a glass by the projector, the combiner is provided to show characters or images overlapped with real sights As shown in FIG. 1, a projector Po (including DLP projectors) is provided to image by using a display screen or a diffuser sheet is needed. A rear projection projector Po with a translucent penetrating diffuser sheet is placed in the back of the diffuser sheet. The principle of the projector Po is scanning a picture and projecting spots with different colors to every point on the projected plane for forming the picture. When the projector Po is provided to project to the mirror of the reflector A, since the incidence angle is equal to the reflection angle, if the reflection plane A1 of the reflector A is a mirror, only a little light of the reflected picture may be reflected to the eye Eo of a specific user, so the user could only see a point light source at any angle, but not see a complete picture.
So the viewer can only see one point light source at any angle, and can't see a complete picture.

Thus, the projector Po cannot project to a glossy reflection plane, a matte reflection plane B1 should be used (as shown in FIG. 2) to scatter the reflected light, to let the reflected light be dispersed to various reflection angles. The reflector with a matte reflection plane B1 is called a diffuser sheet B, light is emitted to a reflection plane B1, some of the light is absorbed and the remaining light is reflected, the reflected light is dispersed to various angles and the eye Eo could see the whole picture at any angle, but the amount of light becomes small at a single angle. Therefore, a projector Po is usually used in a dark environment. A better projection screen would have powder coated for increasing reflection, to reduce light absorption and increase the intensity of reflection light, but the cost would increase a lot and the effect is limited, it could only reduce the absorption ratio, but the loss dispersed to various angles is unrecoverable.

The laser beam is continuous and synchronized, so it is theoretically constructive interference. A laser projector need to project on a diffuser sheet for imaging, in a general diffuser sheet, a rough surface is provided to diffuse images. Reflected laser light may generate irregular phase differences due to the rough surface, so bright and dark speckles may be shown because of constructive interference at some points and destructive interference at some points. The image quality of a laser projector is directly affected by the speckles, and the speckles are difficult to remove.

There are many methods to reduce speckle, a common method is setting a transparent disc with irregular texture on the light source, and it is driven to rotate by a motor to thereby destroy the consistency of the laser source. Since laser light consistency is continuous, dynamic is needed to destroy the consistency, the motor is needed to drive the transparent disc to rotate. However, the size of the structure is big and its cost is high, and it may also reduce the intensity of the light source.

In order to solve the above problems, the industry disclosed various solutions continuously, relative prior arts may be referred to cited references TW I622505, TW I367405, TW I449950, TW M455182, TW I506299, TW I485432, TW I579591, TW I578085.

Most of the above cited references have already improved technology of the head-up display device, but there are still some drawbacks to be overcome, for example, the bright unevenness problem caused by interference cannot be solved effectively, or the cost increasing problem due to large structure, and the problem that the maximum image brightness cannot be achieved, these technical bottlenecks are needed to be overcome.

SUMMARY OF THE INVENTION

In view of this, the inventor finally completed the head-up display device with reflecting target diffuser sheet of the present invention after numerous improvements, namely, the object of the present invention is to provide the head-up display device with reflecting target diffuser sheet provided to reduce interference. Due to the property of the elliptical surface, the optical paths of the image light source reflected from any point on the diffuser sheet to the Eye Box are the same, the diffused light can remain continuously synchronized to remain consistent constructive interference, the image brightness can remain consistent, no speckle exists, to thereby reduce the bright unevenness caused by interference, achieve low cost by not having too much structure, and maximize image brightness.

To achieve the object of the present invention, the head-up display device with reflecting target diffuser sheet of the present invention includes:

an image projection module, which is provided to project an image light source;

a reflecting target diffuser sheet, a plane is set on the reflecting target diffuser sheet, an array of micro-mirrors is set on the plane, the image light source is projected to the reflecting target diffuser sheet, wherein the reflection angles of the micro-mirrors are different;

the feature is: each micro-mirror is provided to reflect and diffuse the projected image light source to a design diffusion area, the design diffusion areas of the micro-mirrors set in different positions are the same or different, and the intersection range of the design diffusion areas of the micro-mirrors is an Eye Box, the projected images can be seen when an eye is in the range of the Eye Box.

The head-up display device with reflecting target diffuser sheet of the present invention further includes a reflector and a concave mirror, the reflecting target diffuser sheet is provided to reflect the image light source to the reflector, the reflector is provided to reflect the image light source to the concave mirror, the concave mirror is provided to reflect the image light source to the position of the Eye Box.

The head-up display device with reflecting target diffuser sheet of the present invention further includes a reflector, a concave mirror and a windshield, the reflecting target diffuser sheet is provided to reflect the image light source to the reflector, the reflector is provided to reflect the image light source to the concave mirror, the concave mirror is provided to reflect the image light source to the windshield, the windshield is provided to reflect the image light source to the position of the Eye Box.

The above array of micro-mirrors set on the reflecting target diffuser sheet is provided to achieve a required projection image by using the micro-mirrors set on all or partial area to reflect the projection image.

The diffusion areas of the micro-mirrors set in different positions can be the same or different.

The above image projection module is a laser projector device, and the diameter of the spot of its laser beam is smaller than the micro-mirrors.

The head-up display device with reflecting target diffuser sheet of the present invention further includes a reflector, the reflecting target diffuser sheet is provided to reflect the image light source to the reflector, the reflector is provided to reflect the image light source to the position of the Eye Box.

The head-up display device with reflecting target diffuser sheet of the present invention further includes a reflector and a windshield, the reflecting target diffuser sheet is provided to reflect the image light source to the reflector, the reflector is provided to reflect the image light source to the windshield, the windshield is provided to reflect the image light source to the position of the Eye Box.

The above reflector is a concave mirror, the concave mirror is provided to reflect and enlarge images.

The above windshield, a reflective film with translucent semi-reflective effect is set on it.

The head-up display device with reflecting target diffuser sheet of the present invention includes:

an image projection module, which is provided to project an image light source;

a reflecting target diffuser sheet, a curved surface set on the reflecting target diffuser sheet, an array of micro-mirrors is set on the curved surface, the image light source is projected to the reflecting target diffuser sheet;

the feature is: each micro-mirror is provided to reflect and diffuse the projected image light source to a design diffusion area, the design diffusion areas of the micro-mirrors set in different positions are the same or different, and the intersection range of the design diffusion areas of the micro-mirrors is an Eye Box, the projected images can be seen when an eye is in the range of the Eye Box.

The head-up display device with reflecting target diffuser sheet of the present invention further includes a reflector and a concave mirror, the reflecting target diffuser sheet is provided to reflect the image light source to the reflector, the reflector is provided to reflect the image light source to the concave mirror, the concave mirror is provided to reflect the image light source to the position of the Eye Box.

The head-up display device with reflecting target diffuser sheet of the present invention further includes a reflector, a concave mirror and a windshield, the reflecting target diffuser sheet is provided to reflect the image light source to the reflector, the reflector is provided to reflect the image light source to the concave mirror, the concave mirror is provided to reflect the image light source to the windshield, the windshield is provided to reflect the image light source to the position of the Eye Box.

The above array of micro-mirrors set on the reflecting target diffuser sheet is provided to achieve a required projection image by using the micro-mirrors set on all or partial area to reflect the projection image, the design diffusion areas of the micro-mirrors set in different positions are the same or different.

The above image projection module is a laser projection device, and the diameter of the spot of its laser beam is smaller than the micro-mirrors.

The head-up display device with reflecting target diffuser sheet of the present invention further includes a reflector, the reflecting target diffuser sheet is provided to reflect the image light source to the reflector, the reflector is provided to reflect the image light source to the position of the Eye Box.

The head-up display device with reflecting target diffuser sheet of the present invention further includes a reflector and a windshield, the reflecting target diffuser sheet is provided to reflect the image light source to the reflector, the reflector is provided to reflect the image light source to the windshield, the windshield is provided to reflect the image light source to the position of the Eye Box.

The above reflector is a concave mirror, the concave mirror is provided to reflect and enlarge images.

The above windshield, a reflective film with translucent semi-reflective effect is set on it.

The head-up display device with reflecting target diffuser sheet of the present invention, wherein the curved surface of the reflecting target diffuser sheet is an elliptical surface, the feature is that the image projection module is placed on a first focal point of the elliptical surface, the image light source is projected to the elliptical surface of the reflecting target diffuser sheet, the image light source is reflected by the elliptical surface of the reflecting target diffuser sheet, all the reflected image light source is concentrated on a second focal point of the elliptical surface, the second focal point is the position of the Eye Box.

The head-up display device with reflecting target diffuser sheet of the present invention, wherein the reflecting target diffuser sheet is made by setting the array of micro-mirrors in the same direction on a flexible board, and the flexible board is provided to be attached to the curved surface, to thereby let the micro-mirrors on the reflecting target diffuser sheet project to required directions.

DETAILED DESCRIPTION OF THE INVENTION

Figure 1:
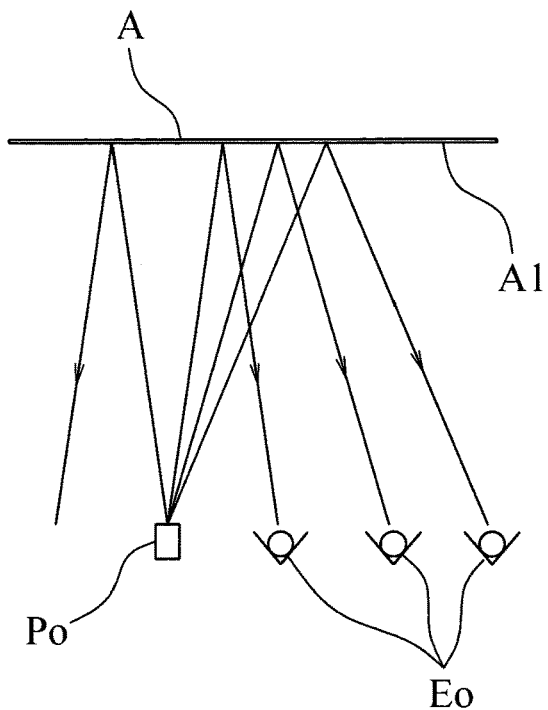
FIG. 1 is a schematic diagram of a conventional projection device.
Figure 2:
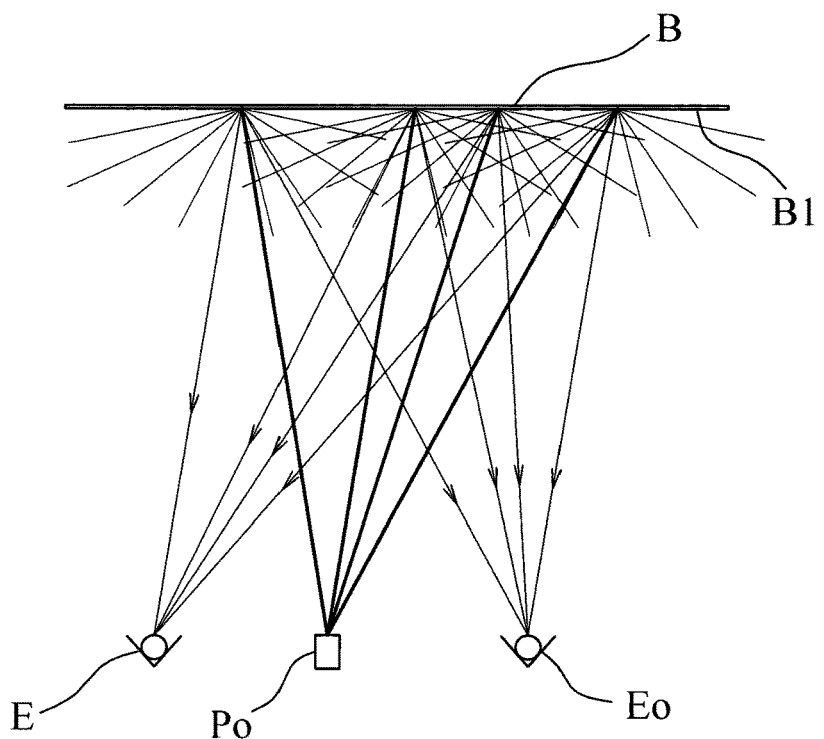
FIG. 2 is a schematic diagram of another embodiment of a conventional projection device.

Please refer to FIG. 3 to FIG. 11, which is the first embodiment of the head-up display device with reflecting target diffuser sheet of the present invention, including:

an image projection module 1, which is provided to project an image light source L, the projection device 1 is a laser projection device;

a reflecting target diffuser sheet 2, a plane is set on it, an array of micro-mirrors 21 is set on the plane, the image light source L is projected to the reflecting target diffuser sheet 2, wherein the reflection angles 211 of the micro-mirrors 21 may be different.

Figure 3:
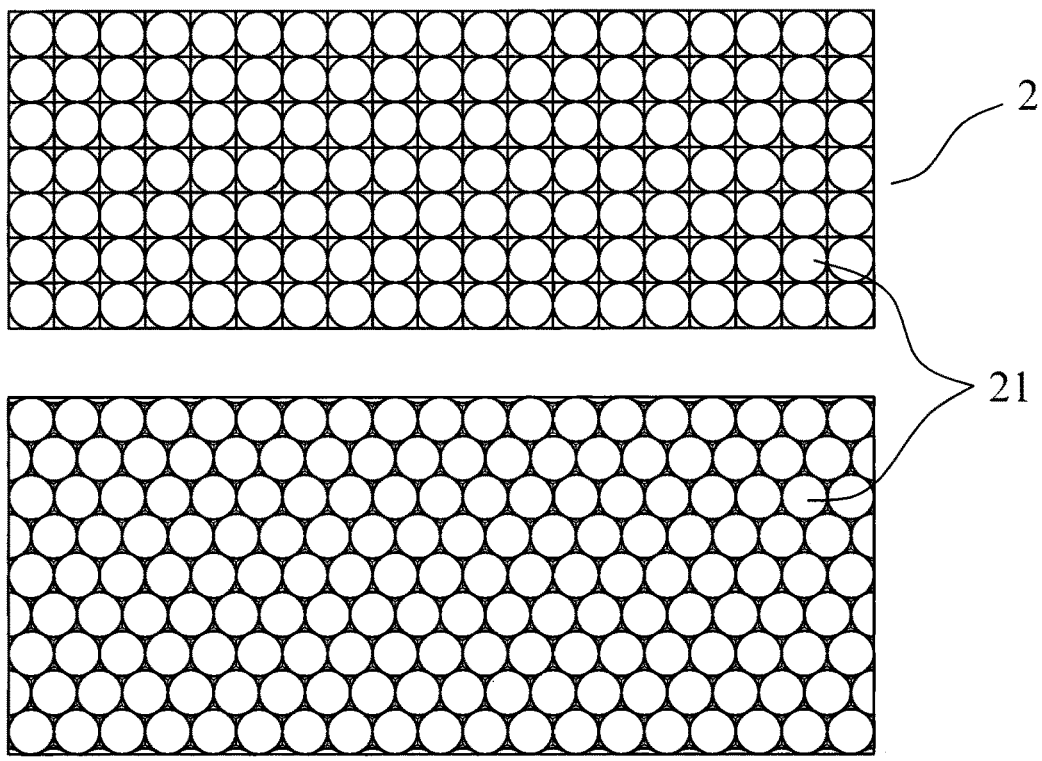
FIG. 3 is an enlarged diagram of the structure of the array of the micro-mirrors according to the present invention.

As shown in FIG. 3, the reflecting target diffuser sheet 2 is an square array or a hexagonal honeycomb array arranged by multiple micro-mirrors 21.

Figure 4:
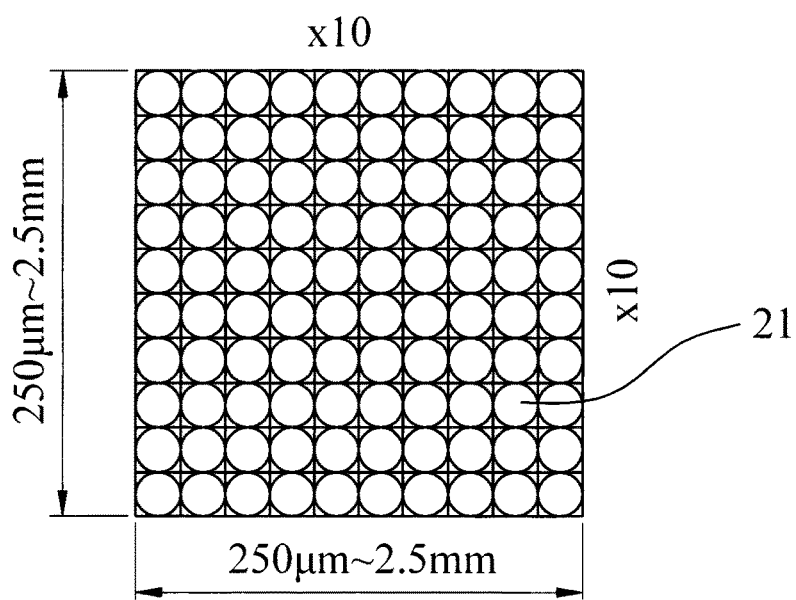
FIG. 4 is a schematic diagram of size of the micro-mirrors according to the present invention.

As shown in FIG. 4, size of each micro-mirror 21 may be 25 um to 0.25 mm according to the embodiment, but it is not limited to this range.

Figure 5:
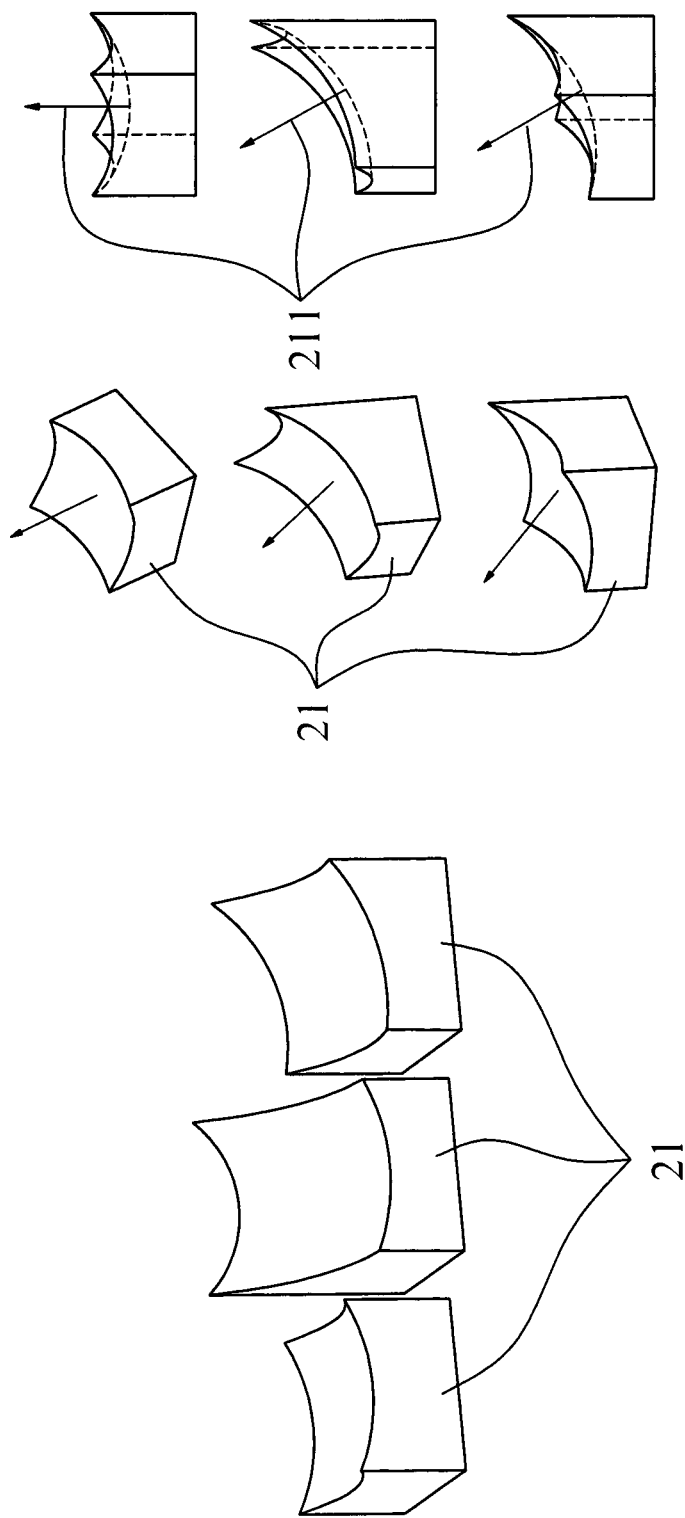
FIG. 5 is an enlarged diagram of the micro-mirrors according to the present invention.

As shown in FIG. 5, it is an enlarged diagram of the micro-mirrors as an example, each micro-mirror is a concave mirror with a reflection angle 211, which could face to any direction according to needs, so that the directivity of the reflecting target diffuser sheet 2 has a high degree of freedom.

Figure 6:
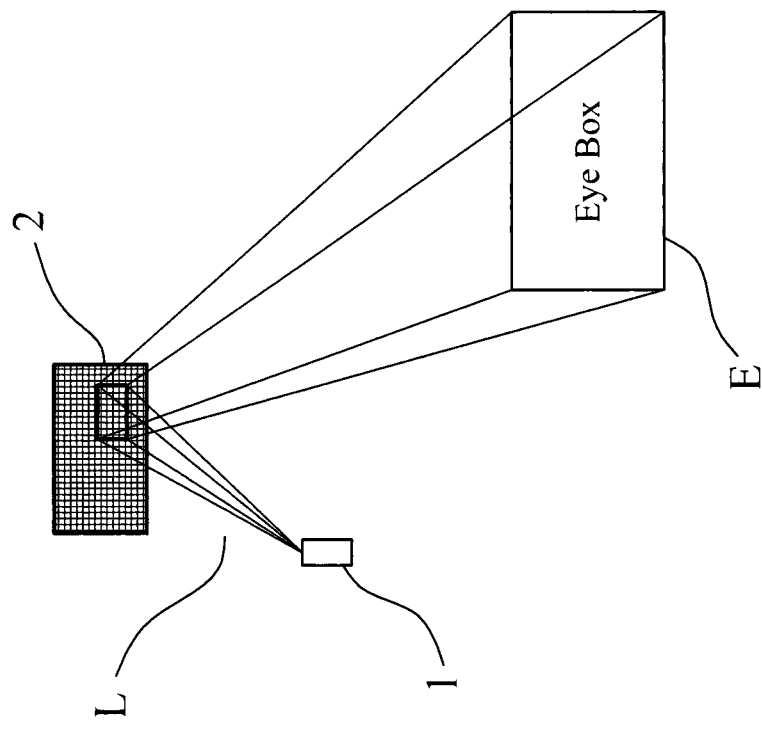
FIG. 6 is a schematic diagram of projection and imaging of the diffuser sheet according to the present invention.
Figure 6:
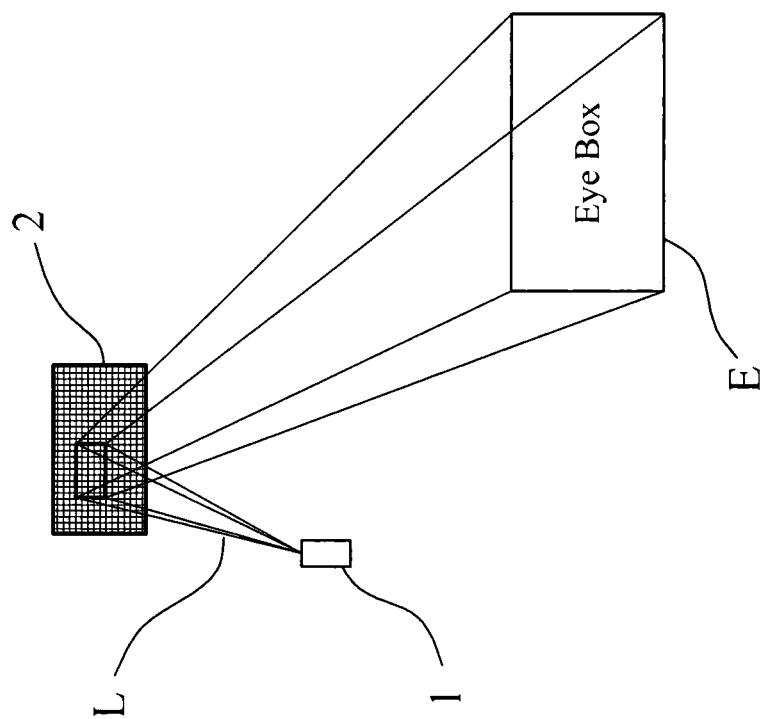

As shown in FIG. 6, the array of micro-mirrors 21 set on the reflecting target diffuser sheet 2 is provided to achieve a required projection image by using the micro-mirrors 21 set on all or partial area to reflect the projection image.

Figure 7:
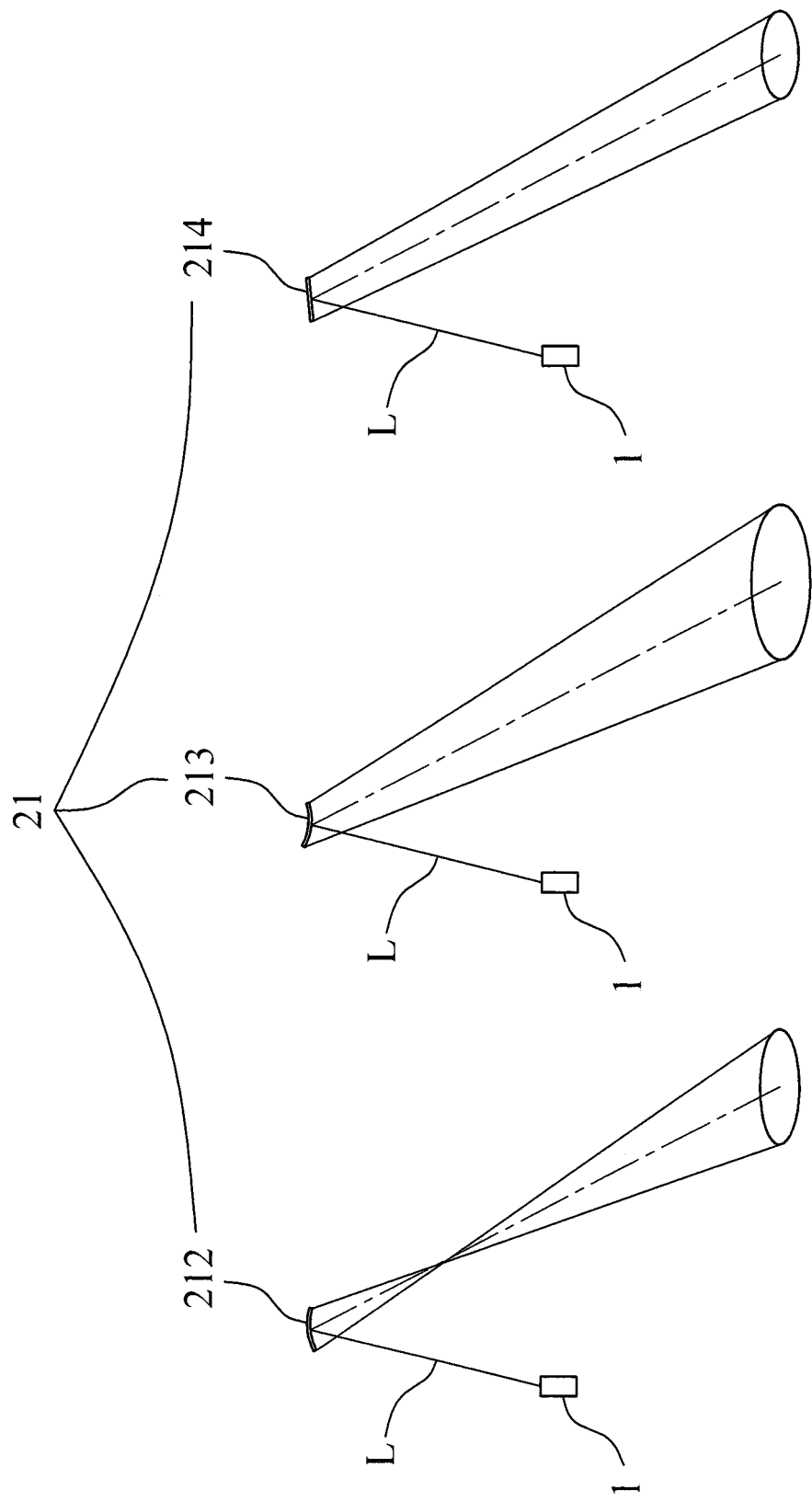
FIG. 7 is a schematic diagram of diffusion of the micro-mirrors according to the present invention.

As shown in FIG. 7, each micro-mirror 21 on the reflecting target diffuser sheet 2 could be a concave mirror 212, a convex mirror 213 or a plane mirror 214, the placement angle and the curved surface of the micro-mirrors 21 could be designed according to required functions, to thereby control diffusion angle and coverage, namely, the image light source L projected to the micro-mirrors 21 would diffuse to a specific angle and coverage.

The projection device 1 is a laser projection device, if the diameter of the spot of its laser beam is smaller than the micro-mirrors 21, the situation that a laser beam is projected to multiple micro-mirrors 21 does not happen, so as to avoid interference, to thereby solve the speckle problem.

Figure 8:
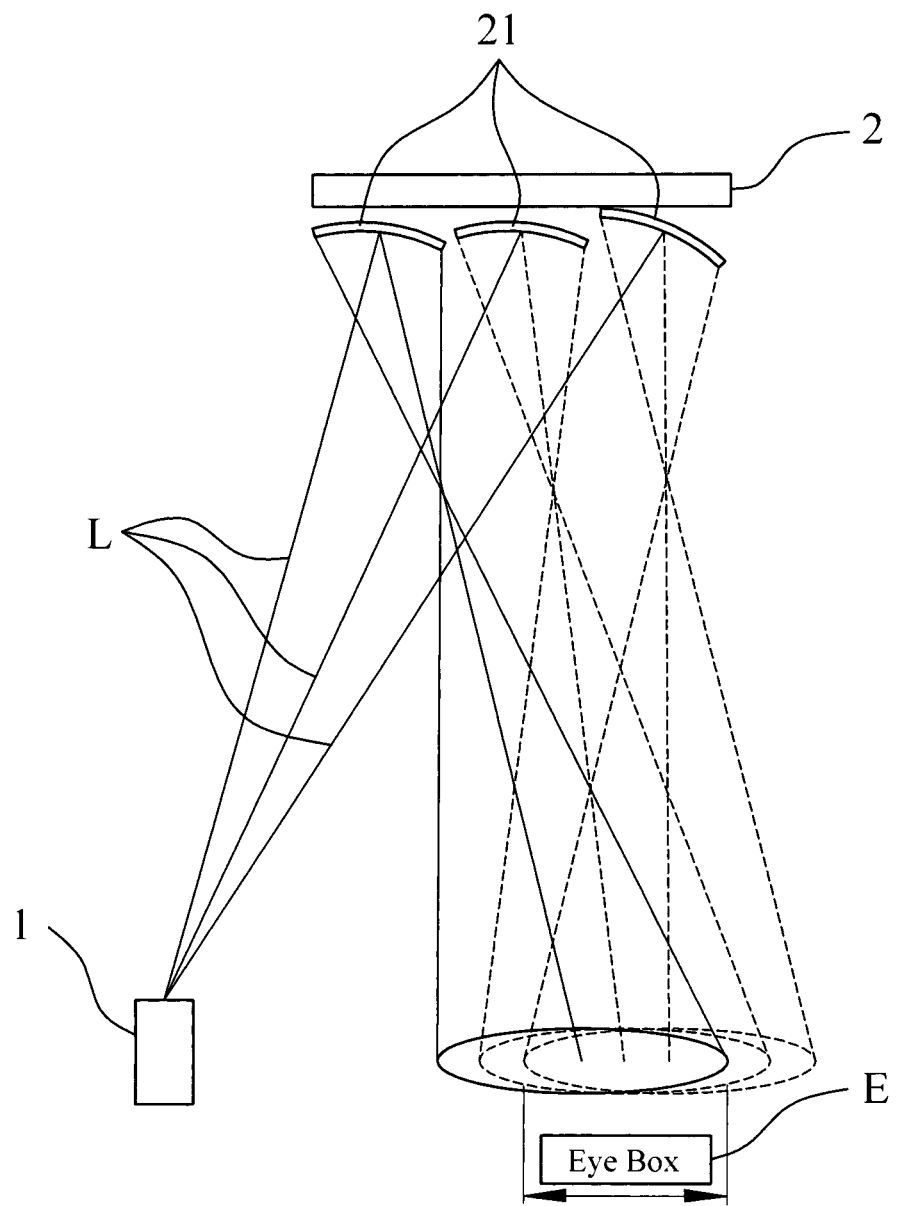
FIG. 8 is a schematic diagram of diffusion from the array of the micro-mirrors set on the diffuser sheet to the Eye Box according to the present invention.

As shown in FIG. 8, in the present invention, multiple micro-mirrors 21 are further used to be distributed on the reflecting target diffuser sheet 2, each micro-mirror 21 has different angle or curved surface.

The feature of the present invention is that each micro-mirror 21 is provided to reflect and diffuse the projected image light source L to a design diffusion area, the design diffusion areas of the micro-mirrors 21 set in different positions are the same or different, and the intersection range of the design diffusion areas of the micro-mirrors 21 is an Eye Box E, the projected images can be seen when an eye is in the range of the Eye Box.

Figure 9:
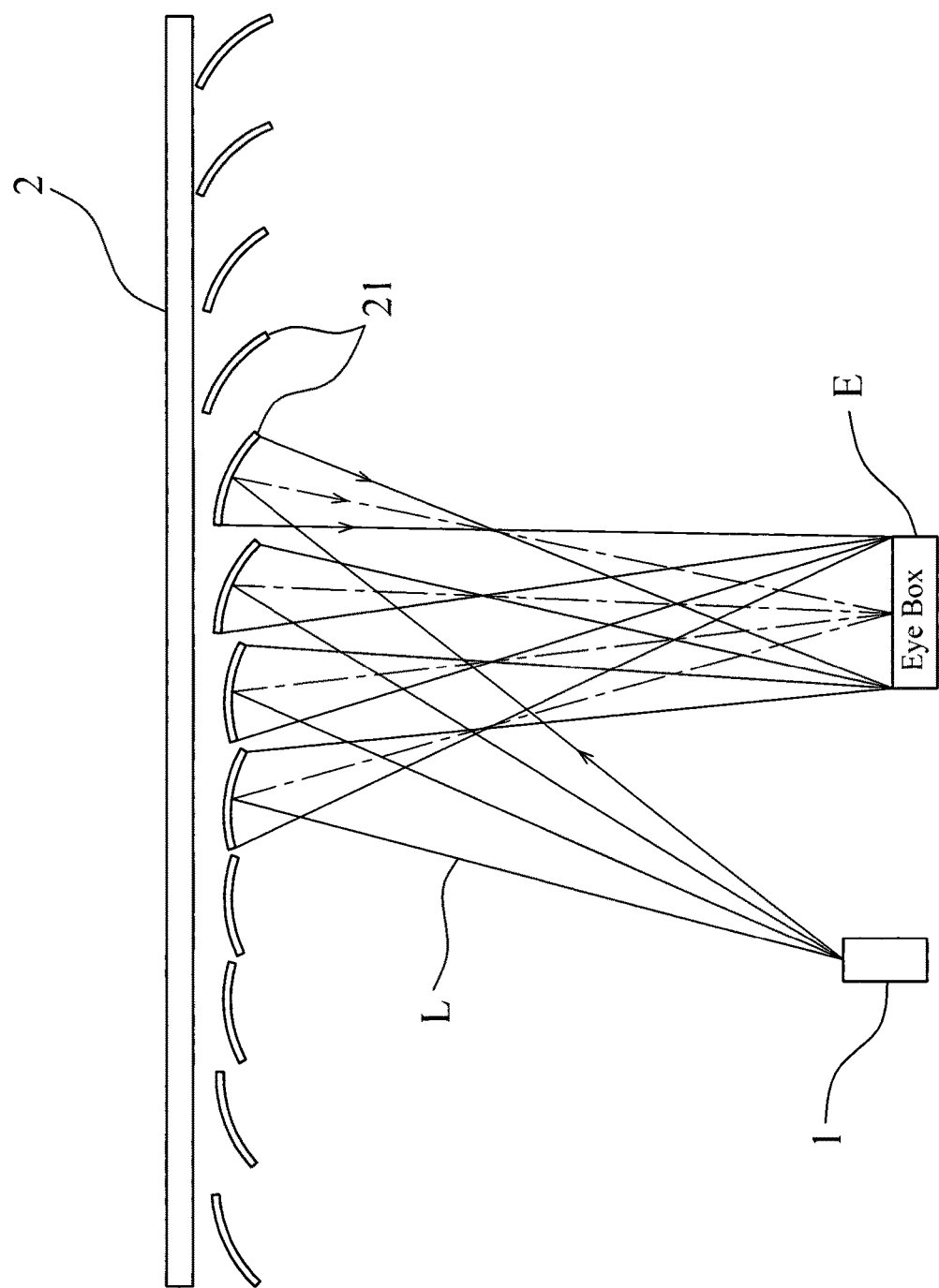
FIG. 9 is a schematic diagram of the first embodiment of the present invention.

As shown in FIG. 9, wherein the micro-mirrors are concave mirrors, the micro-mirrors 21 are distributed on the reflecting target diffuser sheet 2, the micro-mirrors 21 with different angles are provided to reflect and diffuse the projected image light source L to a same coverage, the overlapped coverage is the Eye Box E.

Figure 10:
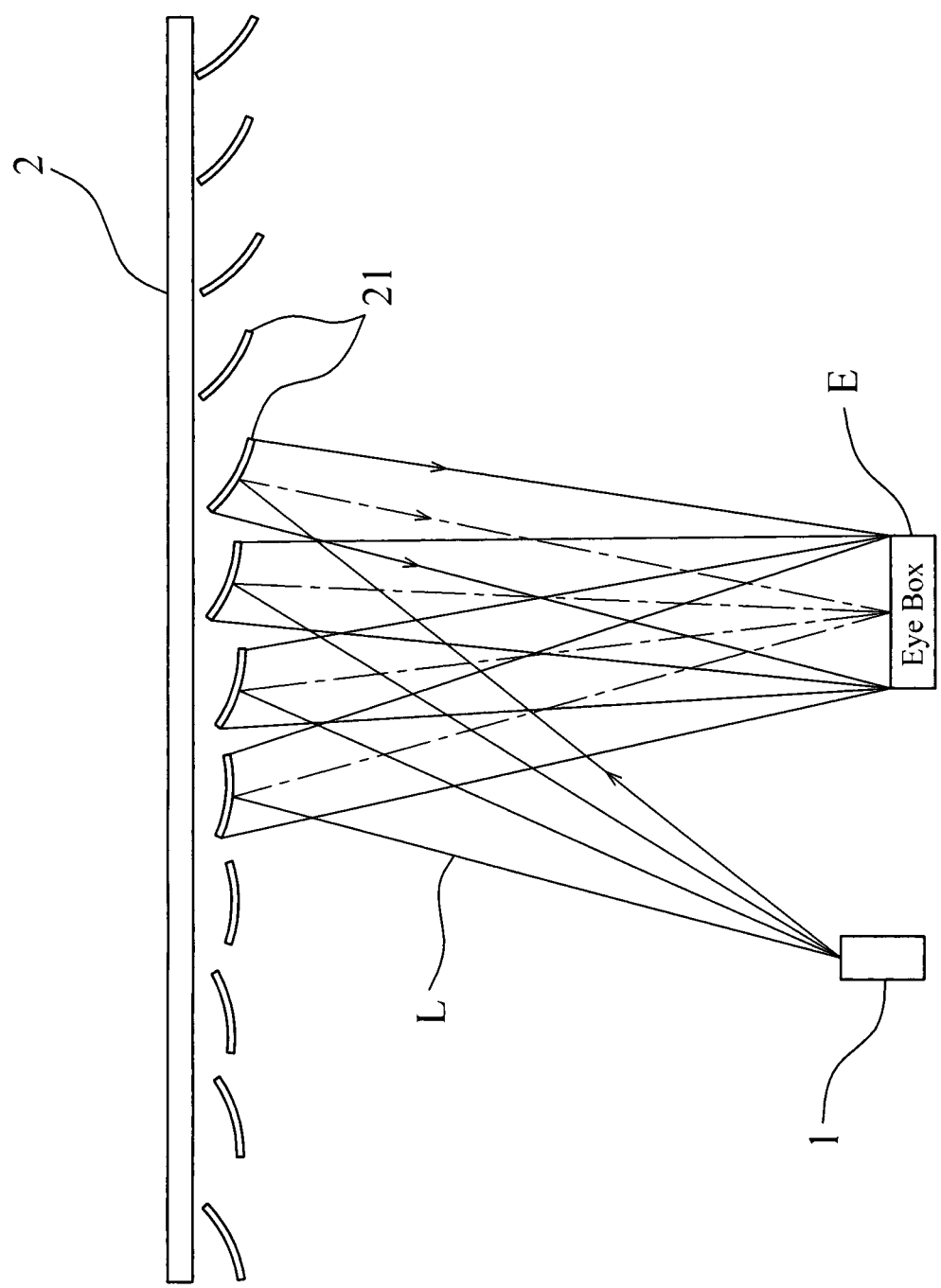
FIG. 10 is another schematic diagram of the first embodiment of the present invention.

As shown in FIG. 10, wherein the micro-mirrors 21 are convex mirrors, which are provided to reflect and diffuse the projected image light source L to a same coverage, the overlapped coverage is the Eye Box E.

Figure 11:
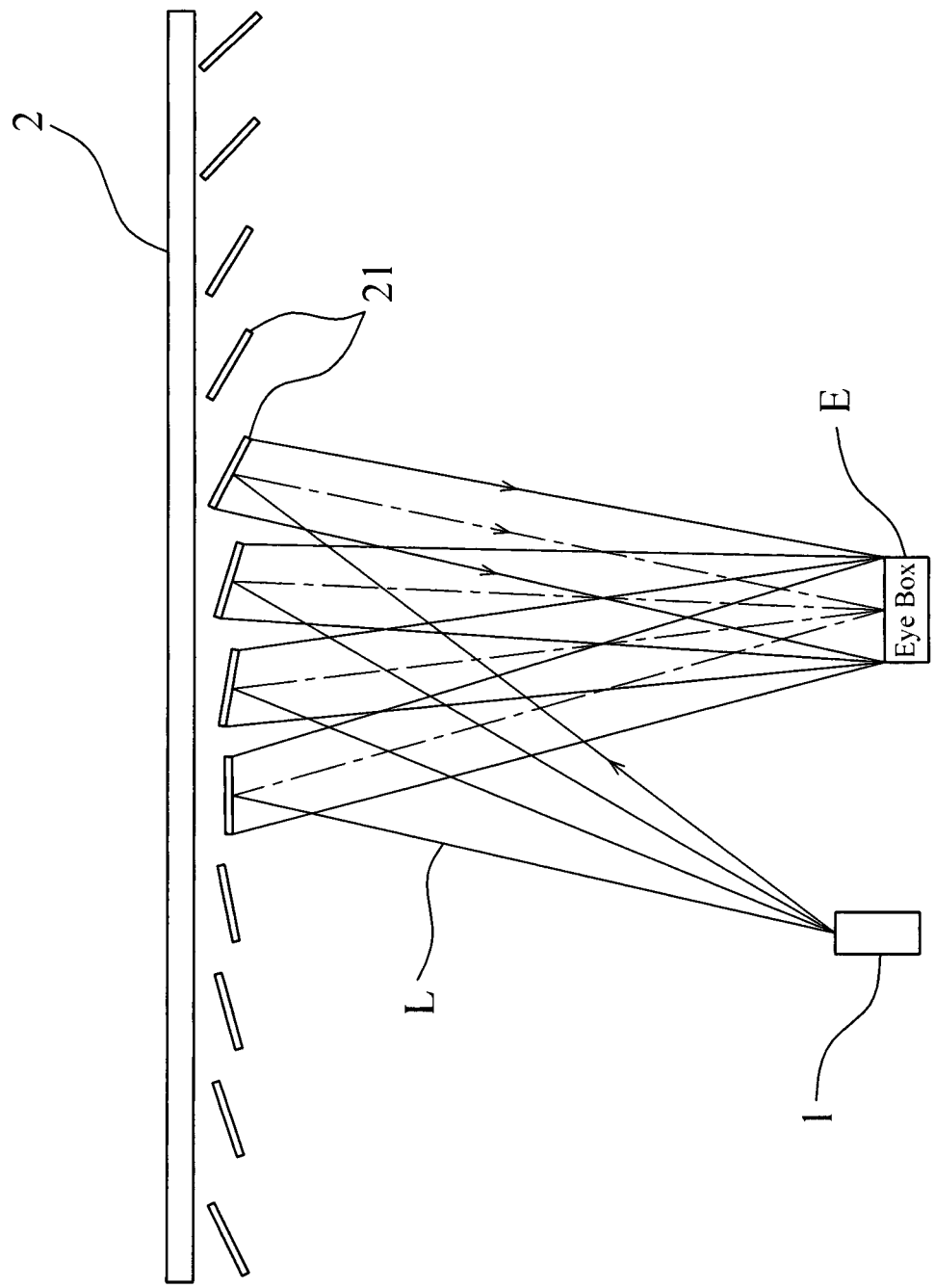
FIG. 11 is the other schematic diagram of the first embodiment of the present invention.

As shown in FIG. 11, wherein the micro-mirrors 21 are plane mirrors, the diffusion effect of the micro-mirrors 21 is worse, so the light reflected by the reflecting target diffuser sheet 2 is more concentrated and the coverage of the Eye Box is smaller.

As shown in FIG. 12 to FIG. 16, the second embodiment of the head-up display device with the reflecting target diffuser sheet (please refer to FIG. 12) includes:

an image projection module 1, which is provided to project an image light source L, the projection device 1 is a laser projection device;

a target reflecting target diffuser sheet 2, a curved surface is set on it, an array of micro-mirrors 21 is set on the curved surface, the image light source L is projected to the reflecting target diffuser sheet 2;

the feature is that each micro-mirror 21 is provided to reflect and diffuse the projected image light source L to a design diffusion area, the design diffusion areas of the micro-mirrors 21 set in different positions are the same or different, and the intersection range of the design diffusion areas of the micro-mirrors 21 is an Eye Box E, the projected images can be seen when an eye is in the range of the Eye Box.

In the present invention, the reflecting target diffuser sheet 2 is made by setting the array of micro-mirrors 21 in the same direction on a flexible board, and the flexible board is provided to be attached to the curved surface, to thereby let the micro-mirrors 21 on the reflecting target diffuser sheet 2 project to required directions.

Figure 12:
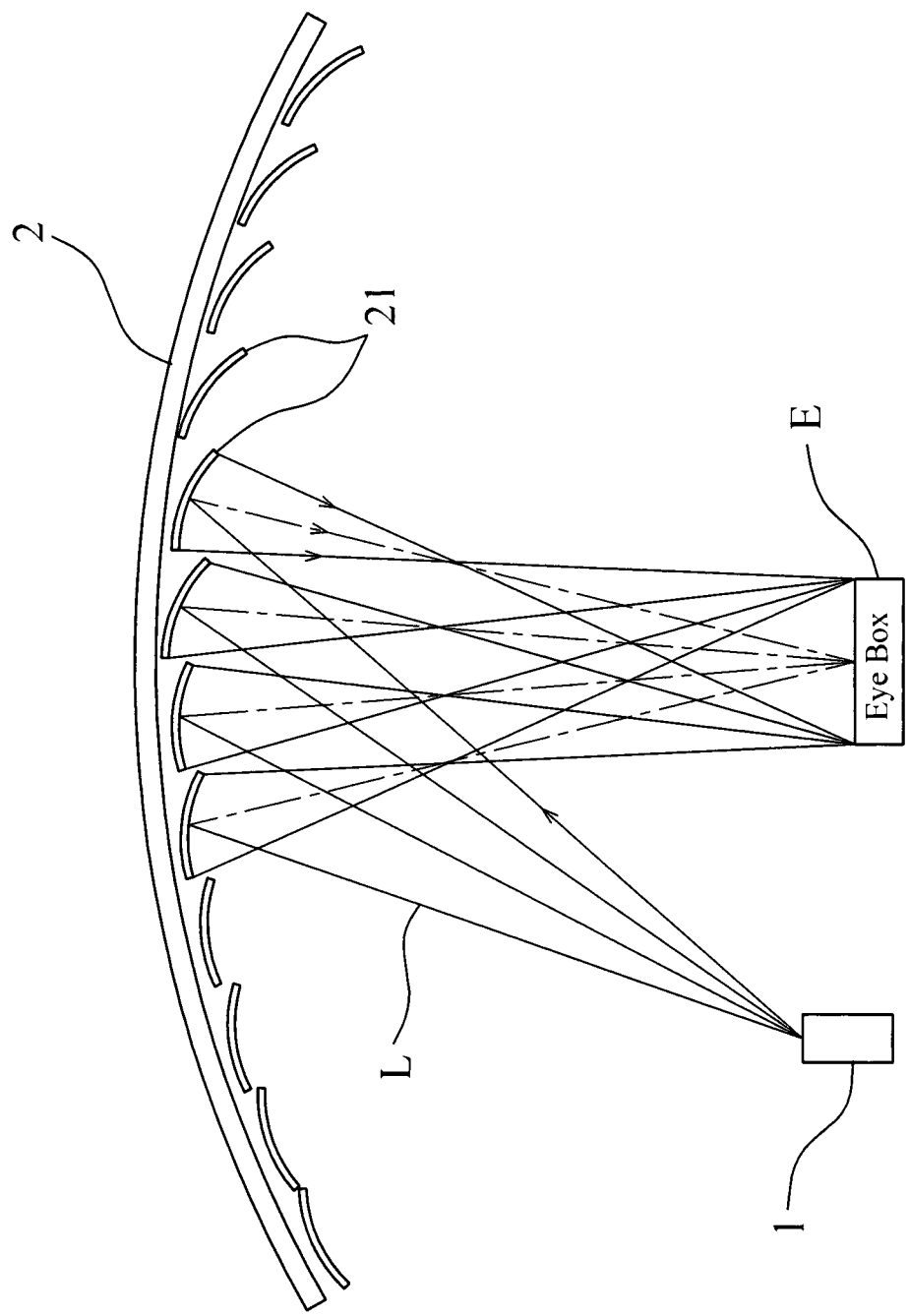
FIG. 12 is a schematic diagram of the second embodiment of the present invention.

As shown in FIG. 12, wherein the micro-mirrors 21 are concave mirrors, the micro-mirrors 21 are distributed on the reflecting target diffuser sheet 2, the micro-mirrors 21 with different angles are provided to reflect and diffuse the projected image light source L to a same coverage, the overlapped coverage is the Eye Box.

Figure 13:
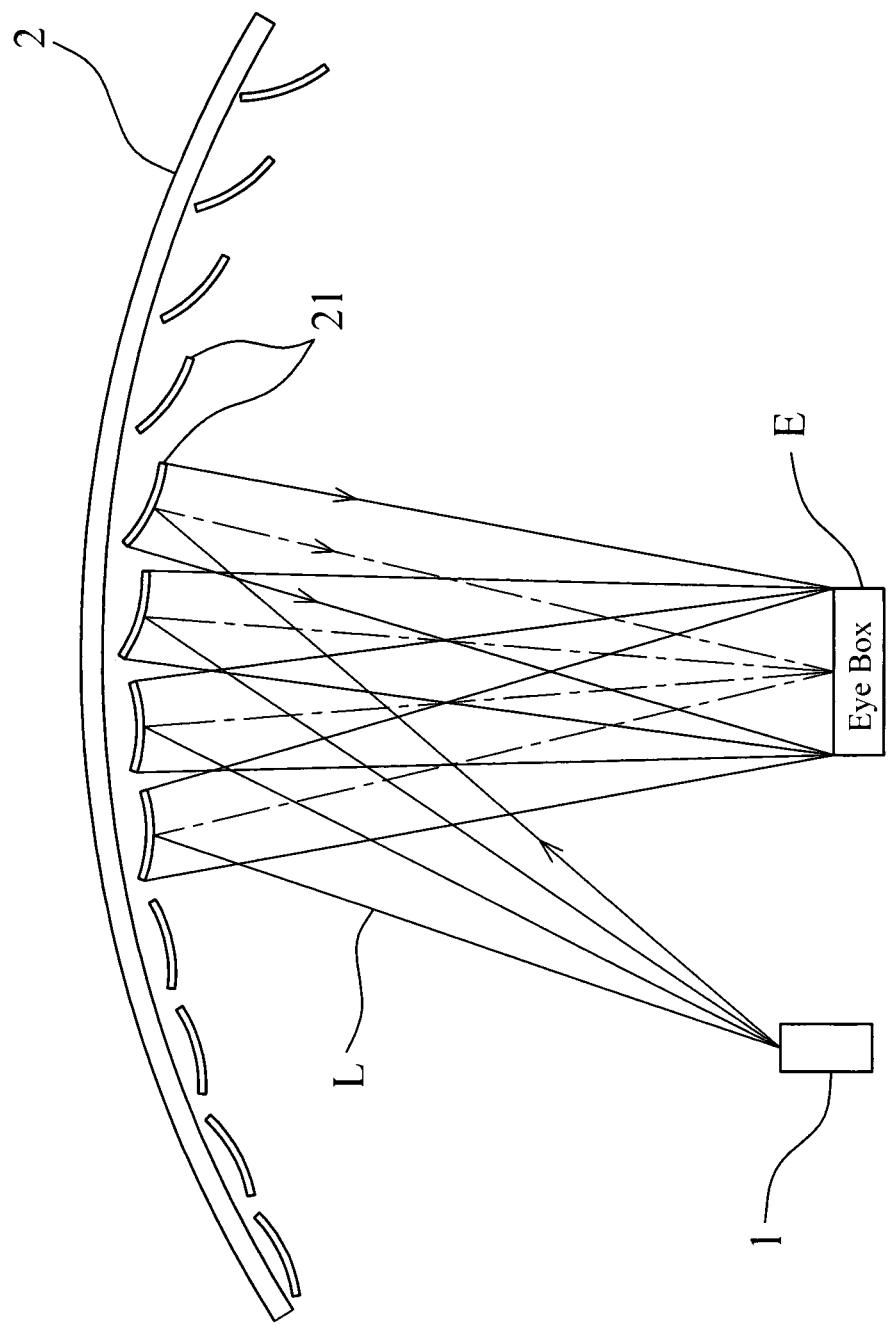
FIG. 13 is another schematic diagram of the second embodiment of the present invention.

As shown in FIG. 13, wherein the micro-mirrors 21 are convex mirrors, which are provided to reflect and diffuse the projected image light source to a same coverage, the overlapped coverage is the Eye Box.

Figure 14:
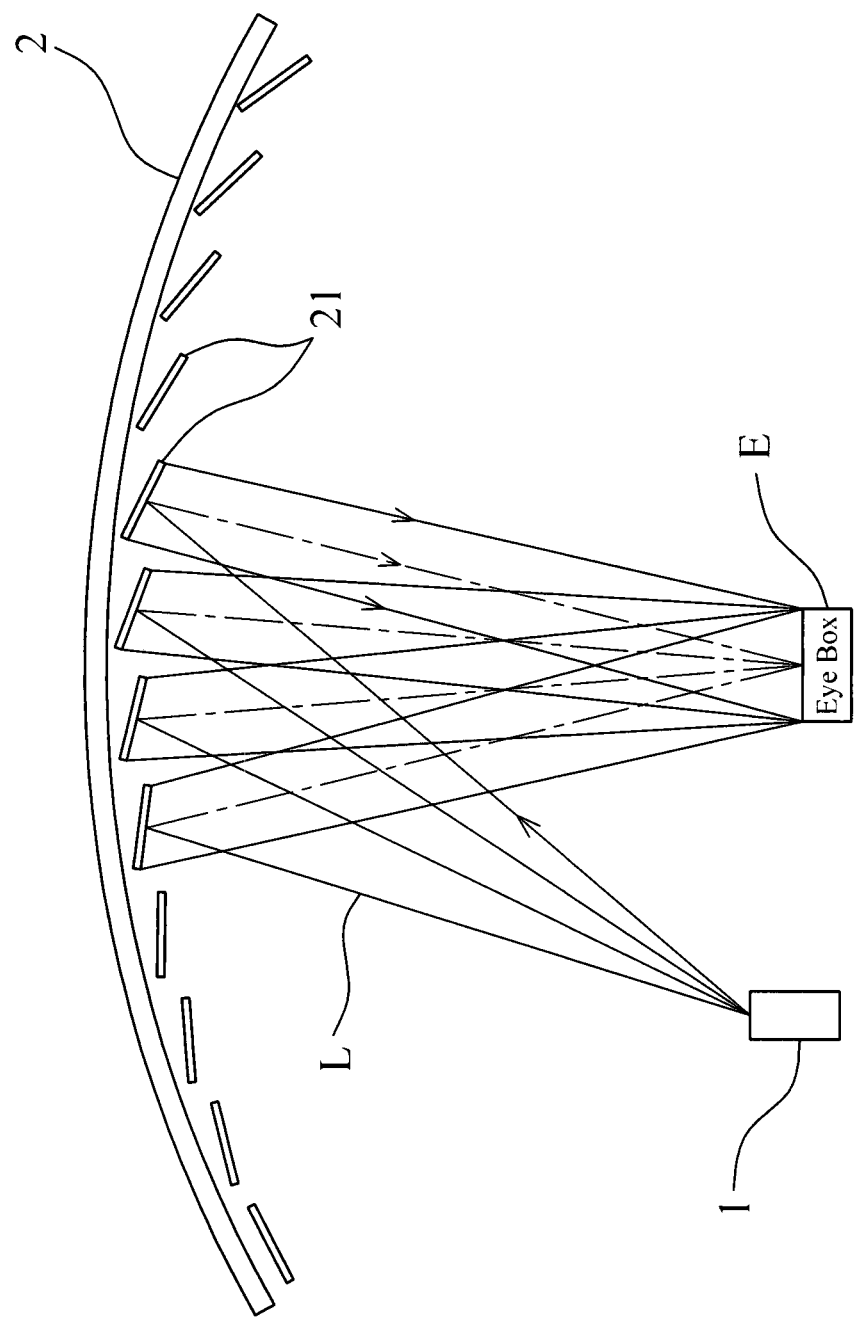
FIG. 14 is the other schematic diagram of the second embodiment of the present invention.

As shown in FIG. 14, wherein the micro-mirrors 21 are plane mirrors, the diffusion effect of the micro-mirrors 21 is worse, so the light reflected by the reflecting target diffuser sheet 2 is more concentrated and the coverage of the Eye Box is smaller.

Figure 15:
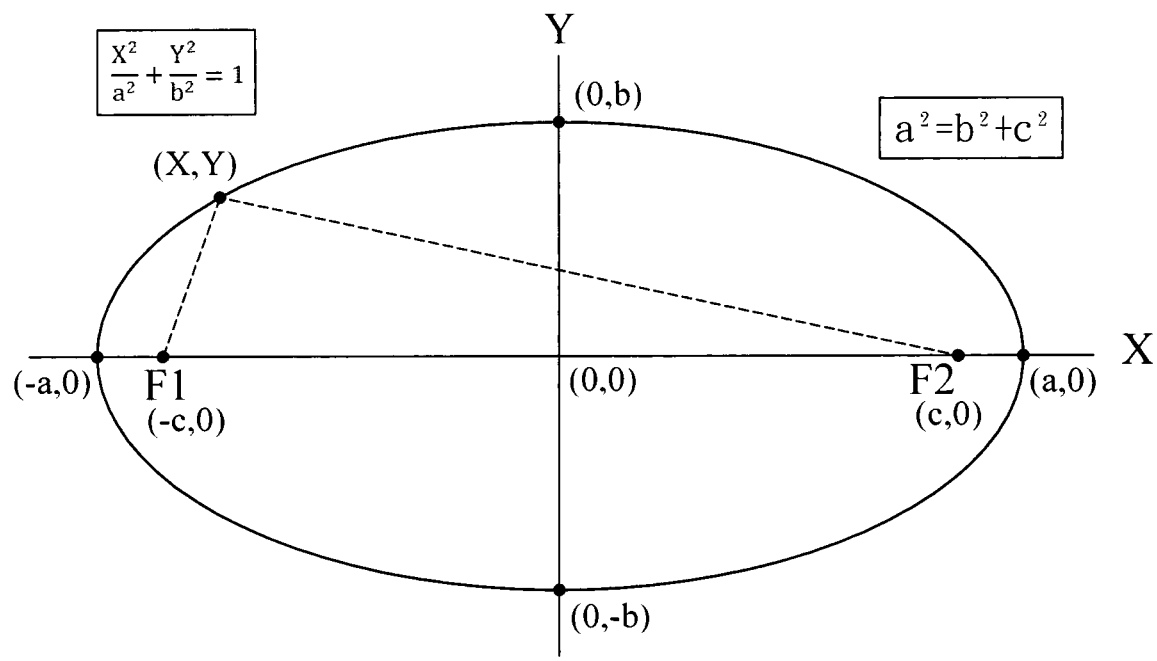
FIG. 15 is a schematic diagram of the elliptical surface of the second embodiment according to the present invention.

As shown in FIG. 15, the reflecting target diffuser sheet 2 is an array of the micro-mirrors 21 set on a curved surface, wherein the curved surface of the reflecting target diffuser sheet 2 is an elliptical surface. An ellipse is the path curve of all the points on a plane that the sum of the distances to two fixed points is constant, the two fixed points are the first focal point F1 and the second focal point F2; the line section through the two focal points and ended at the ellipse is called a major axis; the line section through the center (the midpoint of the two focal points), vertical to the major axis and ended at the ellipse is called a minor axis, $2a$ is the major axis of the ellipse, $2b$ is the minor axis of the ellipse. If the focal length of the ellipse is c, then $a^2=b^2+c^2$.

The path equation of the ellipse is $$\frac{X^2}{a^2} + \frac{Y^2}{b^2} = 1$$

Figure 16:
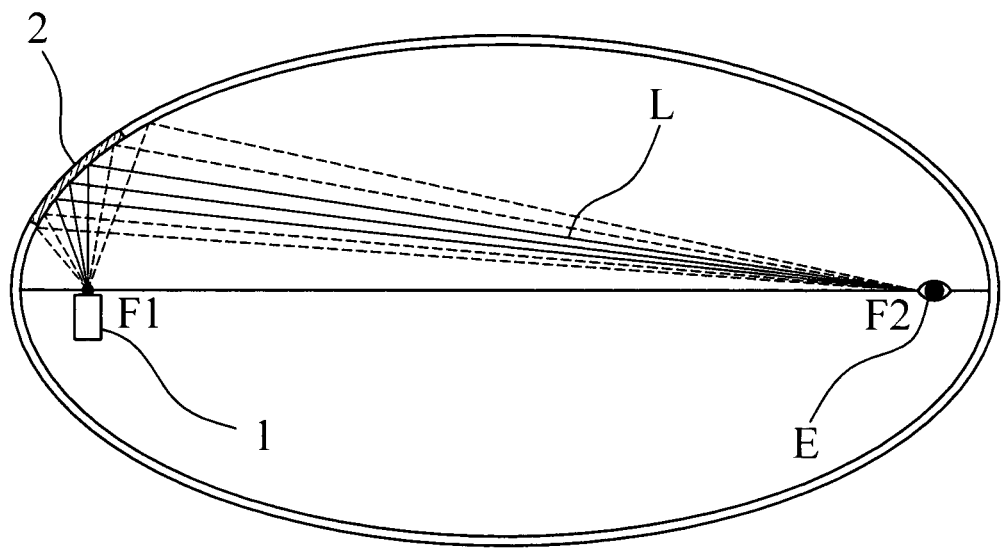
FIG. 16 is another schematic diagram of the elliptical surface of the second embodiment according to the present invention.

As shown in FIG. 16, according to the path equation of the ellipse, if light emitted from one of the focal points of the elliptical surface (for example, the first focal point F1) to any direction is reflected by the elliptical surface, the reflected light must passes through another focal point (for example, the second focal point F2), and vice versa.

The feature of the present invention is that the image projection module 1 is placed on a first focal point F1 of the elliptical surface of the reflecting target is diffuser sheet 2, the image light source L is projected to the elliptical surface of the reflecting target diffuser sheet 2, all the reflected image light source L is concentrated on a second focal point F2 of the elliptical surface of the reflecting target diffuser sheet 2, the second focal point F2 is the position of the Eye Box E seen by users.

Due to the property of the elliptical surface, the optical paths of the image light source reflected from any point on the reflecting target diffuser sheet 2 to the Eye Box E are the same, the diffused light can remain continuously synchronized to remain consistent constructive interference, the image brightness can remain consistent, no speckle exists, so as to reduce the bright unevenness caused by interference, achieve low cost by not having too much structure, and maximize image brightness.

Figure 17:
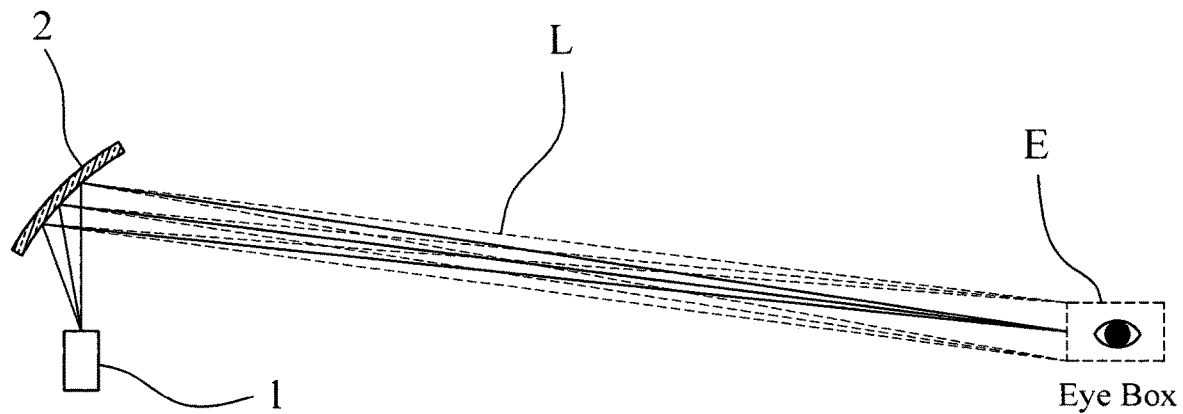
FIG. 17 is a schematic diagram of the third embodiment of the present invention.

As shown in FIG. 17, the third embodiment of the head-up display device with the reflecting target diffuser sheet of the present invention includes:

an image projection module 1, which is provided to project an image light source L;

a reflecting target diffuser sheet 2, an elliptical surface is set on it, an array of micro-mirrors 21 is set on the elliptical surface, the image light source L is projected to the reflecting target diffuser sheet 2, the reflecting target diffuser sheet 2 is provided to reflect the image light source L to the position of the Eye Box.

The feature of the present invention is that projecting the image light source L to the elliptical surface of the reflecting target diffuser sheet 2, and all the reflected image light source L may be concentrated on the position of the Eye Box E, which is equivalent to another focal point of the elliptical surface of the reflecting target diffuser sheet 2.

Figure 18:
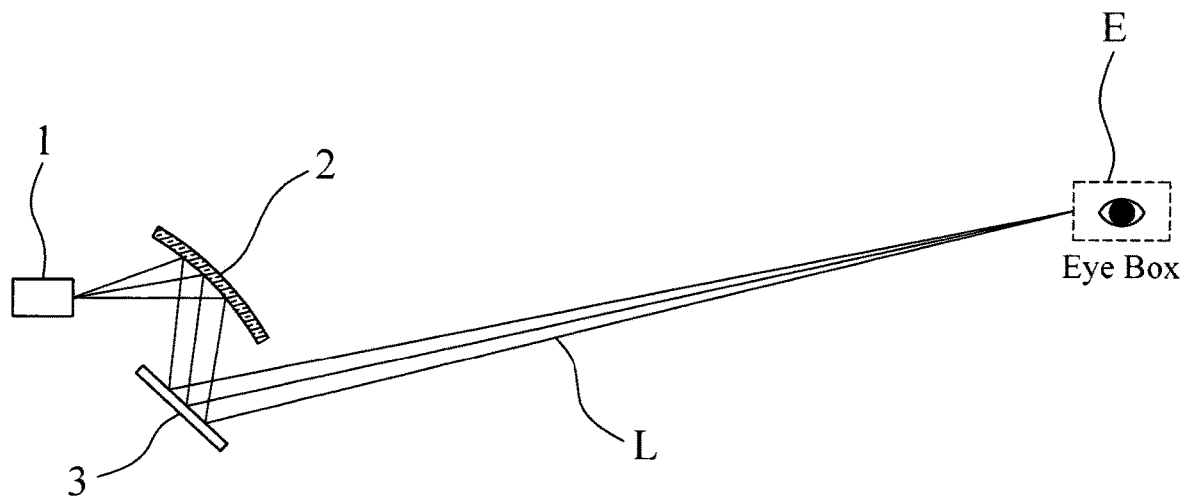
FIG. 18 is a schematic diagram of the fourth embodiment of the present invention.

As shown in FIG. 18, the fourth embodiment of the head-up display device with the reflecting target diffuser sheet of the present invention includes:

an image projection module 1, which is provided to project an image light source L;

a reflecting target diffuser sheet 2, which is an array of the micro-mirrors 21 set on a plane or a curved surface, the image light source L is projected to the reflecting target diffuser sheet 2;

a reflector 3, which could be a concave mirror, a convex mirror or a plane mirror, the reflecting target diffuser sheet 2 is provided to reflect the image light source L to the reflector 3, the reflector 3 is provided to reflect the image light source L to the position of the Eye Box.

Figure 19:
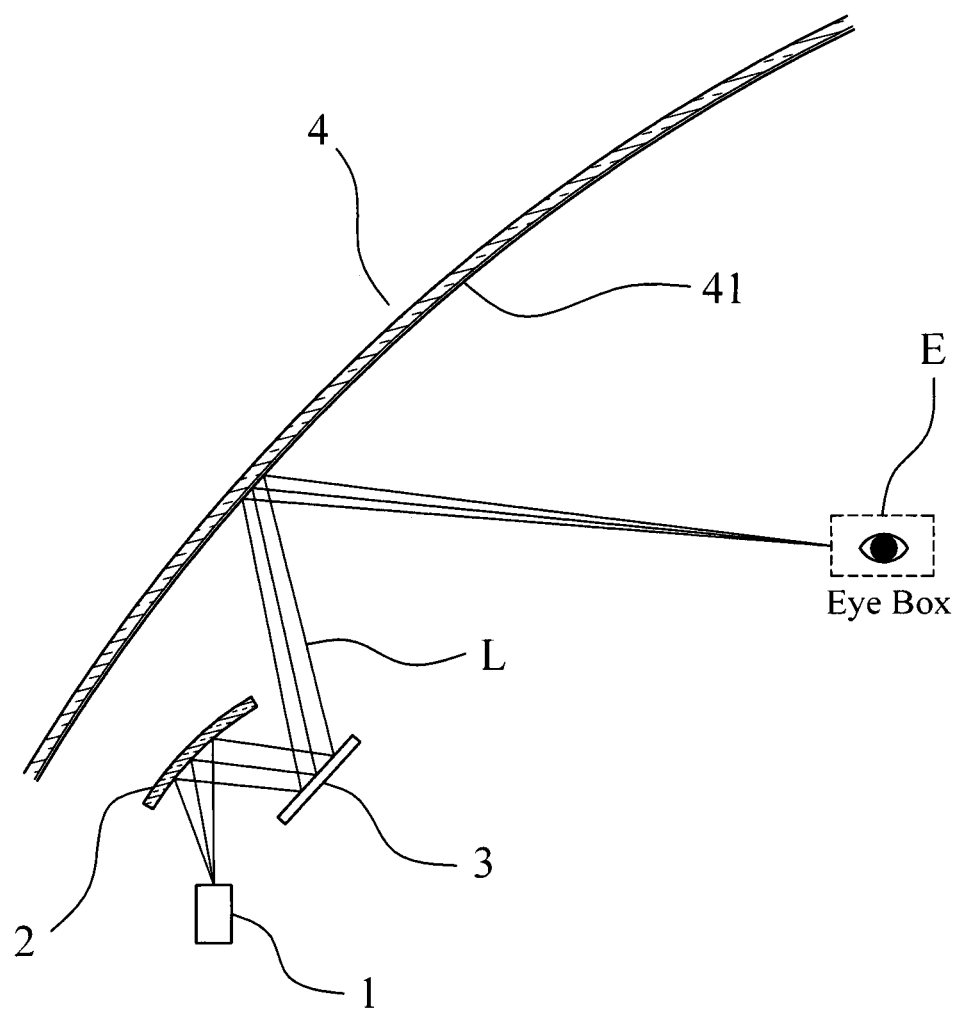
FIG. 19 is a schematic diagram of the fifth embodiment of the present invention.

As shown in FIG. 19, the fifth embodiment of the head-up display device with the reflecting target diffuser sheet of the present invention includes:

an image projection module 1, which is provided to project an image light source L;

a reflecting target diffuser sheet 2, a plane or a curved surface is set on it, the array of the micro-mirrors 21 is set on the plane or the curved surface, the image light source L is projected to the reflecting target diffuser sheet 2;

a reflector 3, which could be a concave mirror, a convex mirror or a plane mirror, the reflecting target diffuser sheet 2 is provided to reflect the image light source L to the reflector 3;

a windshield 4, the reflector 3 is provided to reflect the image light source to the windshield 4, the windshield 4 is provided to reflect the image light source L to the position of the Eye Box.

A reflective film 41 with translucent semi-reflective effect is set on the windshield 4 to thereby increase the reflectivity of the image light source L.

Figure 20:
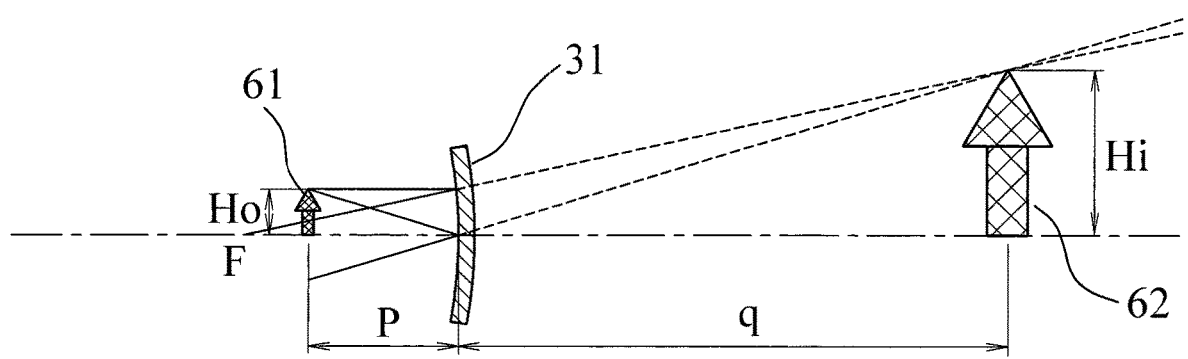
FIG. 20 is a schematic diagram of the enlarged virtual image of the concave mirror according to the present invention.

As shown in FIG. 20, it is a schematic diagram of the enlarged virtual image of a concave mirror, wherein the focal point of the concave mirror 31 is F. When the object 61 is placed between the focal point F and the concave mirror 31, the image of the object 61 is formed behind the concave mirror 31 and it is an enlarged erect virtual image 62, its magnification can be derived from the ratio of the image distance q to the object distance p (its magnification can also be derived from the ratio of the height Ho of the object and the imaging height Hi); if the object 61 is closer to the focal point F, its magnification is larger; if the object 61 is placed on the focal point F, the image is formed at infinity.

Figure 21:
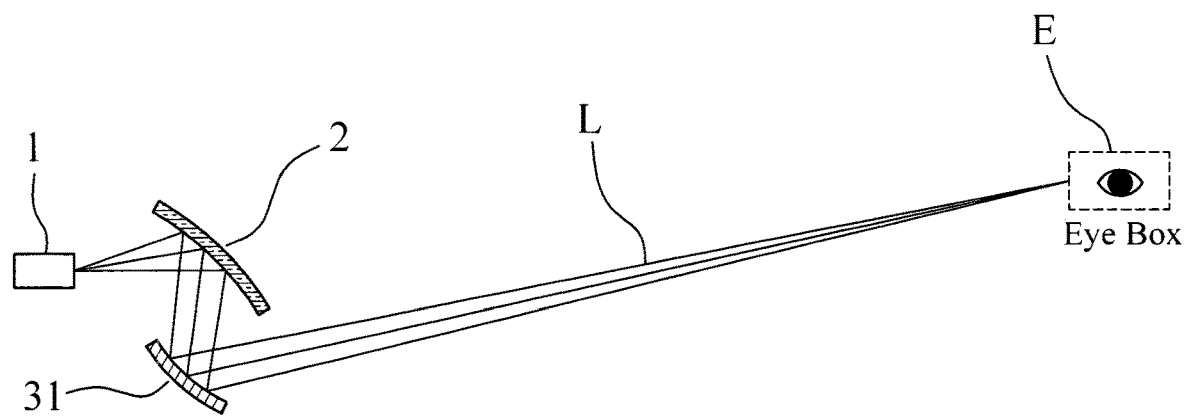
FIG. 21 is a schematic diagram of the sixth embodiment of the present invention.

As shown in FIG. 21, the sixth embodiment of the head-up display device with the reflecting target diffuser sheet of the present invention includes:

an image projection module 1, which is provided to project an image light source L;

a reflecting target diffuser sheet 2, a plane or a curved surface is set on it, the array of the micro-mirrors 21 is set on the plane or the curved surface, the image light source L is projected to the reflecting target diffuser sheet 2;

a concave mirror 31, the reflecting target diffuser sheet 2 is provided to reflect the image light source L to the concave mirror 31, the concave mirror 31 is provided to reflect and enlarge the image light source L to the position of the Eye Box.

Figure 22:
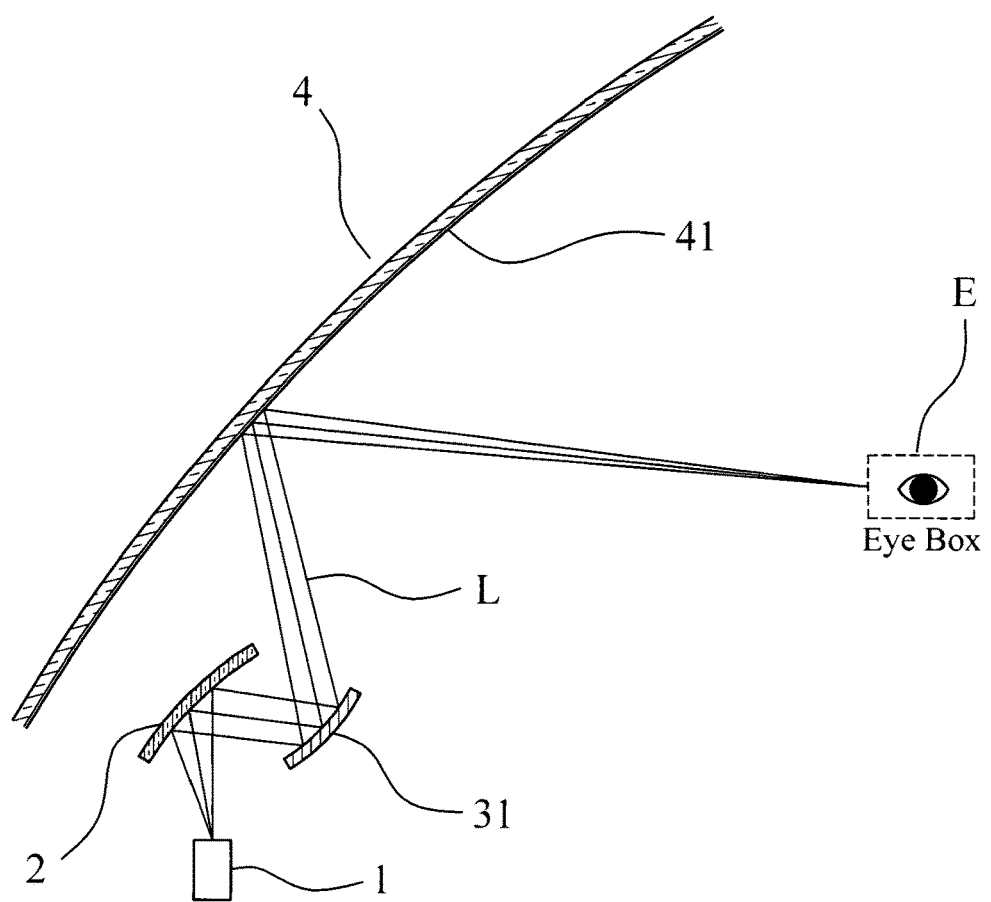
FIG. 22 is a schematic diagram of the seventh embodiment of the present invention.

As shown in FIG. 22, the seventh embodiment of the head-up display device with the reflecting target diffuser sheet of the present invention includes:

an image projection module 1, which is provided to project an image light source L;

a reflecting target diffuser sheet 2, a plane or a curved surface is set on it, the array of the micro-mirrors 21 is set on the plane or the curved surface, the image light source L is projected to the reflecting target diffuser sheet 2;

a concave mirror 31, the reflecting target diffuser sheet 2 is provided to reflect the image light source L to the concave mirror 31;

a windshield 4, the concave mirror 31 is provided to reflect and enlarge the image light source L to the windshield 4, the windshield 4 is provided to reflect the image light source L to the position of the Eye Box.

A reflective film 41 with translucent semi-reflective effect is set on the windshield 4 to thereby increase the reflectivity of the image light source L.

Figure 23:
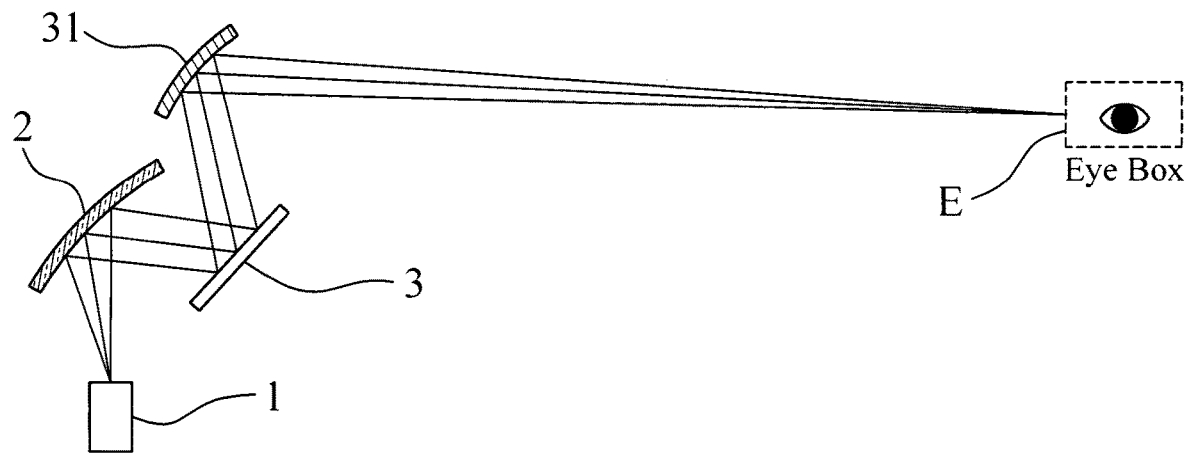
FIG. 23 is a schematic diagram of the eighth embodiment of the present invention.

As shown in FIG. 23, the eighth embodiment of the head-up display device with the reflecting target diffuser sheet of the present invention includes:

an image projection module 1, which is provided to project an image light source L;

a reflecting target diffuser sheet 2, a plane or a curved surface is set on it, the array of the micro-mirrors 21 is set on the plane or the curved surface, the image light source L is projected to the reflecting target diffuser sheet 2;

a reflector 3, which could be a concave mirror, a convex mirror or a plane mirror, the reflecting target diffuser sheet 2 is provided to project the image light source L to the reflector 3;

a concave mirror 31, the reflector 3 is provided to project the image light source L to the concave mirror 31, the concave mirror 31 is provided to reflect and enlarge the image light source L to the position of the Eye Box.

Figure 24:
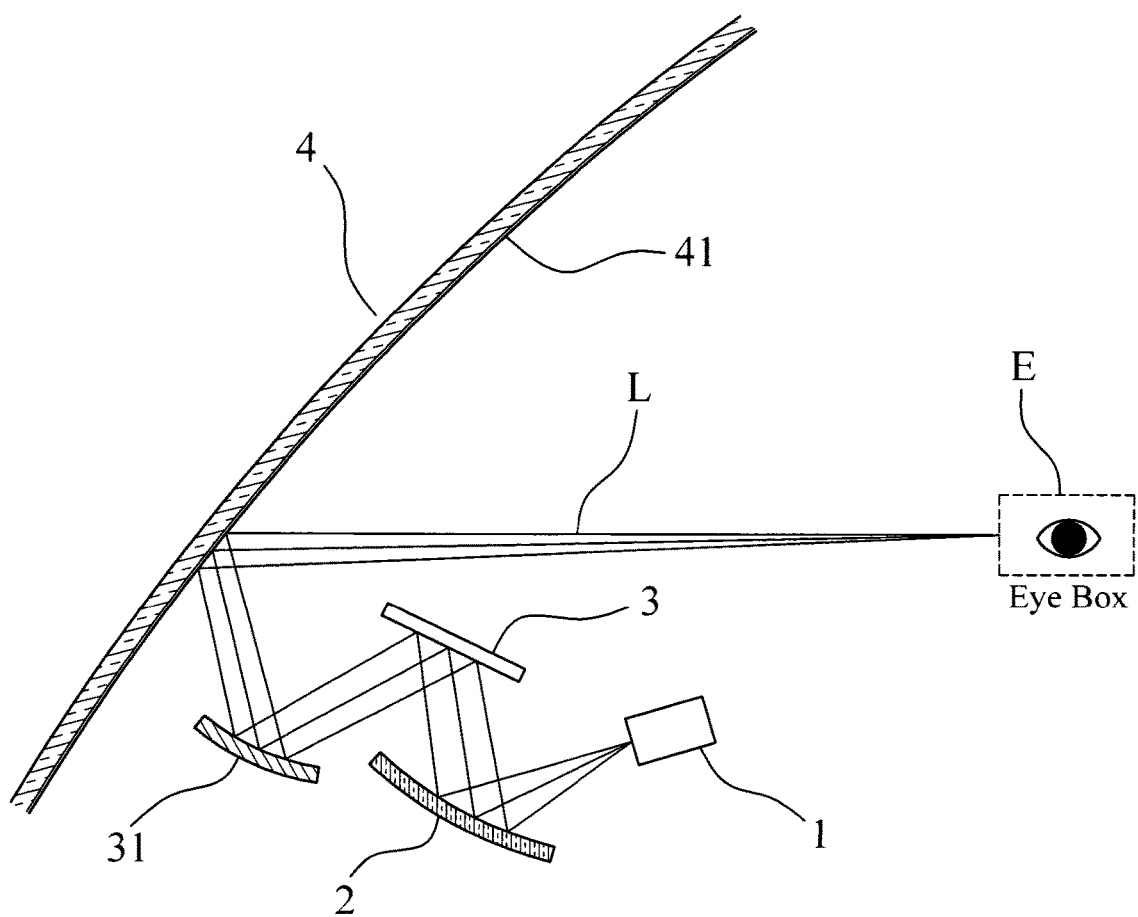
FIG. 24 is a schematic diagram of the ninth embodiment of the present invention.

As shown in FIG. 24, the ninth embodiment of the head-up display device with the reflecting target diffuser sheet of the present invention includes:

an image projection module 1, which is provided to project an image light source L;

a reflecting target diffuser sheet 2, a plane or a curved surface is set on the reflecting target diffuser sheet 2, the array of the micro-mirrors 21 is set on the plane or the curved surface, the image light source L is projected to the reflecting target diffuser sheet 2;

a reflector 3, which could be a concave mirror, a convex mirror or a plane mirror, the reflecting target diffuser sheet 2 is provided to reflect the image light source L to the reflector 3;

a concave mirror 31, the reflector 3 is provided to project the image light source L to the concave mirror 31;

a windshield 4, the concave mirror 31 is provided to project and enlarge the image light source to the windshield 4, the windshield 4 is provided to reflect the image light source L to the position of the Eye Box.

A reflective film 41 with translucent semi-reflective effect is set on the windshield 4 to thereby increase the reflectivity of the image light source L.

What is claimed is:

1. A head-up display device with reflecting target diffuser sheet, including:

an image projection module, which is provided to project an image light source;

a reflecting target diffuser sheet, a curved surface is set on the reflecting target diffuser sheet, an array of micro-mirrors is set on the curved surface, the image light source is projected to the reflecting target diffuser sheet;

the feature is:

each micro-mirror is provided to reflect and diffuse the projected image light source to a design diffusion area, the design diffusion areas of the micro-mirrors set in different positions are the same or different, and the intersection range of the design diffusion areas of the micro-mirrors is an Eye Box, the projected images can be seen when an eye is in the range of the Eye Box;

wherein the curved surface of the reflecting target diffuser sheet is an elliptical surface, the feature is that the image projection module is placed on a first focal point of the elliptical surface, the image light source is projected to the elliptical surface of the reflecting target diffuser sheet, all the reflected image light source is concentrated on a second focal point of the elliptical surface, the second focal point is the position of the Eye Box.

2. The head-up display device with reflecting target diffuser sheet as claimed in claim 1, further includes a reflector and a concave mirror, the reflecting target diffuser sheet is provided to reflect the image light source to the reflector, the reflector is provided to reflect the image light source to the concave mirror, the concave mirror is provided to reflect the image light source to the position of the Eye Box.

3. The head-up display device with reflecting target diffuser sheet as claimed in claim 1, further includes a reflector, a concave mirror and a windshield, the reflecting target diffuser sheet is provided to reflect the image light source to the reflector, the reflector is provided to reflect the image light source to the concave mirror, the concave mirror is provided to reflect the image light source to the windshield, the windshield is provided to reflect the image light source to the position of the Eye Box.

4. The head-up display device with reflecting target diffuser sheet as claimed in claim 1, wherein the array of micro-mirrors set on the reflecting target diffuser sheet is provided to achieve a required projection image by using the micro-mirrors set on all or partial area, the design diffusion areas of the micro-mirrors set in different positions of the diffusion area are the same or different diffusion areas.

5. The head-up display device with reflecting target diffuser sheet as claimed in claim 1, wherein the image projection module is a laser projection device, and the diameter of the spot of its laser beam is smaller than the micro-mirrors.

6. The head-up display device with reflecting target diffuser sheet as claimed in claim 1, further includes a reflector, the reflecting target diffuser sheet is provided to reflects the image light source to the reflector, the reflector is provided to reflect the image light source to the position of the Eye Box.

7. The head-up display device with reflecting target diffuser sheet as claimed in claim 1, further includes a reflector and a windshield, the reflecting target diffuser sheet is provided to reflect the image light source to the reflector, the reflector is provided to reflect the image light source to the windshield, the windshield is provided to reflect the image light source to the position of the Eye Box.

8. The head-up display device with reflecting target diffuser sheet as claimed in claim 1, further includes a reflector and a windshield, the reflector is a concave mirror, the concave mirror is provided to reflect and enlarge images, a reflective film with translucent semi-reflective effect is set on the windshield.

9. The head-up display device with reflecting target diffuser sheet as claimed in claim 1, wherein the reflecting target diffuser sheet is made by setting the array of micro-mirrors in the same direction on a flexible board, and the flexible board is provided to be attached to the curved surface, to thereby let the micro-mirrors on the reflecting target diffuser sheet project to required directions.

* * * * *